United States Patent
Ma et al.

(10) Patent No.: US 12,215,040 B2
(45) Date of Patent: Feb. 4, 2025

(54) LITHIUM NICKEL MANGANESE OXIDE COMPOSITE MATERIAL, PREPARATION METHOD THEREOF AND LITHIUM ION BATTERY

(71) Applicant: SVOLT ENERGY TECHNOLOGY CO., LTD., Jiangsu (CN)

(72) Inventors: Jiali Ma, Jiangsu (CN); Hongxin Yang, Jiangsu (CN); Weijun Jiang, Jiangsu (CN); Qiqi Qiao, Jiangsu (CN); Mingzhu Sun, Jiangsu (CN); Xinpei Xu, Jiangsu (CN); Zetao Shi, Jiangsu (CN); Pengfei Wang, Jiangsu (CN); Sixian Chen, Jiangsu (CN)

(73) Assignee: SVOLT ENERGY TECHNOLOGY CO., LTD., Jiangsu (CN)

( * ) Notice: Subject to any disclaimer, the term of this patent is extended or adjusted under 35 U.S.C. 154(b) by 209 days.

(21) Appl. No.: 17/641,820

(22) PCT Filed: Oct. 28, 2020

(86) PCT No.: PCT/CN2020/124465
§ 371 (c)(1),
(2) Date: Mar. 10, 2022

(87) PCT Pub. No.: WO2021/238050
PCT Pub. Date: Dec. 2, 2021

(65) Prior Publication Data
US 2023/0079339 A1    Mar. 16, 2023

(30) Foreign Application Priority Data
May 25, 2020  (CN) ......................... 202010450693.X

(51) Int. Cl.
*C01G 53/00*    (2006.01)

(52) U.S. Cl.
CPC .......... *C01G 53/50* (2013.01); *C01P 2004/03* (2013.01); *C01P 2006/40* (2013.01)

(58) Field of Classification Search
CPC ..... C01G 53/44; C01G 53/50; C01P 2004/03; C01P 2004/84; C01P 2006/40;
(Continued)

(56) References Cited

U.S. PATENT DOCUMENTS

2012/0244413 A1*  9/2012  Shimano ................ C01G 51/50
                                                        429/231.95
2013/0175469 A1   7/2013  Aulsen et al.

FOREIGN PATENT DOCUMENTS

| CN | 103178258 A | 6/2013 |
|---|---|---|
| CN | 103606660 A | 2/2014 |

(Continued)

OTHER PUBLICATIONS

Machine translation cn107394193a (Year: 2017).*
Lei Chen, et al. "Mechanical grinding and coating modification to prepare high performance LNMO", New Chemical Materials. vol. 48 No. 2.Feb. 29, 2020(Feb. 29, 2020) p. 148-151 and 162.

*Primary Examiner* — Victoria H Lynch
(74) *Attorney, Agent, or Firm* — Samson G. Yu

(57) ABSTRACT

Provided are a lithium nickel manganese oxide composite material, a preparation method thereof and a lithium ion battery. The preparation method includes: a first calcining process is performed on a nano-oxide and a nickel-manganese precursor, to obtain an oxide-coated nickel-manganese precursor; and a second calcining process is performed on the precursor and a lithium source material, to obtain the lithium nickel manganese oxide, and a temperature of the first calcining process is lower than the second calcining process. A a lower temperature, the nano-oxide may be melted, a denser nano-oxide coating layer is formed on the surface of the precursor, so the oxide-coated nickel-manganese precursor is obtained. At a higher temperature, the (Continued)

nano-oxide, a nickel-manganese material and a lithium element may be more deeply combined. A problem that the nano-oxide layer is easy to fall off is solved, and cycle performance of the lithium nickel manganese oxide is greatly improved.

20 Claims, 2 Drawing Sheets

(58) Field of Classification Search
CPC ........... H01M 2004/028; H01M 4/366; H01M 4/525; H01M 4/62; H01M 4/628; Y02E 60/10

See application file for complete search history.

(56) References Cited

FOREIGN PATENT DOCUMENTS

| | | | | |
|---|---|---|---|---|
| CN | 104319386 A | | 1/2015 | |
| CN | 107394193 A | * | 11/2017 | ........ H01M 10/0525 |
| CN | 109811412 A | | 5/2019 | |
| CN | 109888208 A | | 6/2019 | |
| CN | 111592052 A | | 8/2020 | |
| JP | 2004281163 A | | 10/2004 | |
| JP | 2013-539169 A | | 10/2013 | |
| WO | 2013169826 A1 | | 11/2013 | |
| WO | 2018043669 A1 | | 3/2018 | |
| WO | 2019087503 A1 | | 5/2019 | |

* cited by examiner

LITHIUM NICKEL MANGANESE OXIDE COMPOSITE MATERIAL, PREPARATION METHOD THEREOF AND LITHIUM ION BATTERY

TECHNICAL FIELD

The disclosure relates to the field of lithium ion batteries, and in particular to a lithium nickel manganese oxide composite material, a preparation method thereof and a lithium ion battery.

BACKGROUND

A positive electrode material is one of the three key materials for restricting the rapid development of lithium ion batteries. Generally, a lithium cobalt oxide positive electrode material has higher working voltage and better rate performance, but its lower actual capacity greatly limits an application of the lithium cobalt oxide positive electrode material. An olivine-type lithium iron phosphate positive electrode material has advantages of stable structure, good cycle performance, and low raw material price, but a theoretical capacity is lower. A ternary layered positive electrode material (NCM) fully combines advantages of a lithium manganate, a lithium cobaltate and a lithium nickelate, and has advantages of higher discharge specific capacity, better cycle performance, and lower cost and the like. In an existing power market, the ternary positive electrode material is already commercialized, for example, NCM523, NCM622, and NCM811, and it meets requirements of a power vehicle to a certain extent. However, cobalt is strategic metal, and its expensive price makes the cost of the ternary positive electrode material NCM higher. At the same time, a cobalt resource is limited, and a business fluctuation of the market is greater. Therefore, the development of a cobalt-free positive electrode material is very necessary.

While the positive electrode material is synthesized, a residual alkali content on the surface of the material is high, and it is easy to absorb water, so that a battery is easy to decompose during charge-discharge processes, and a disproportionation reaction may occur at the same time, it is caused that the battery cycle performance is lower; at the same time, during a battery preparation process, positive electrode material homogenization may be affected by a pH of the material. If the pH of the positive electrode material is high, a slurry viscosity is unstable, and the homogenization is difficult, so that the battery processing performance is poor. About this problem, a most common solution method at present is to coat the positive electrode material, namely a layer of a uniform nano-oxide is coated on the surface of the material, but this coating method is basically difficult to form a uniform coating layer on the surface of the material. In addition, a binding force between a coating substance and the material itself is weaker, and it is very possible that the coating substance falls off during a subsequent treatment process, thereby effective protection is not formed.

In view of the above problems, it is necessary to provide a cobalt-free positive electrode material with a coating layer that is not easy to fall off, and having good battery cycle performance.

SUMMARY

A main purpose of the disclosure is to provide a lithium nickel manganese oxide composite material, a preparation method thereof and a lithium ion battery, as to solve a problem of an existing ternary positive electrode material that a coating layer is easy to fall off, so that the cycle performance of the ion battery is poor.

In order to achieve the above purpose, one aspect of the disclosure is to provide a preparation method for a lithium nickel manganese oxide composite material, and the preparation method includes: a first calcining process is performed on a nano-oxide and a nickel-manganese precursor, to obtain an oxide-coated nickel-manganese precursor; and a second calcining process is performed on the oxide-coated nickel-manganese precursor and a lithium source material, to obtain the lithium nickel manganese oxide composite material, and a temperature of the first calcining process is lower than a temperature of the second calcining process.

Further, before the first calcining process is performed, the preparation method further includes: a first mixing step is performed on the nano-oxide and the nickel-manganese precursor, to obtain a first mixture; preferably, the first mixing step process is mixed for 10-20 min at a rotation speed of 2000-3000 rpm; preferably, the nano-oxide is selected from two or more in a group consisting of an aluminum oxide, a zirconium oxide, a titanium oxide, a niobium oxide, a tungsten oxide, a lanthanum oxide and a molybdenum oxide; and more preferably, a particle size of the nano-oxide is 300-700 nm.

Further, the first calcining process is a temperature programmed process; preferably, the first calcining process includes: in an oxygen atmosphere, a temperature of a first calcining reaction is increased to a first target temperature at a rate of 3-5° C./min, and a holding time is 4-6 h, herein the first target temperature is 300-600° C.; and the temperature of the first calcining reaction is decreased to a room temperature, to obtain the oxide-coated nickel-manganese precursor.

Further, the nickel-manganese precursor is represented by $Ni_xMn_y(OH)_2$, herein $0.50 \leq x \leq 0.92$, $0.50 \leq y \leq 0.8$, and while the nano-oxide is a mixture of zirconium oxide and aluminum oxide, a weight ratio of the zirconium oxide, the aluminum oxide and the nickel-manganese precursor is (0.001-0.003):(0.001-0.003):1.

Further, before the second calcining process is performed, the preparation method further includes: a second mixing step is performed on the oxide-coated nickel-manganese precursor and the lithium source material, to obtain a second mixture; preferably, the second mixing step process is mixed for 10-20 min at a rotation speed of 2000-3000 rpm; preferably, the preparation method further includes: a product of the first calcining process is sieved, to obtain the oxide-coated nickel-manganese precursor, and a sieving aperture of the sieving process is 300-400 meshes.

Further, the second calcining process is a temperature programmed process; preferably, the second calcining process includes: in an oxygen atmosphere, a temperature of a second calcining reaction is increased to a second target temperature at a rate of 3-5° C./min, and holding time is 8-12 h, herein the second target temperature is 910-950° C.; and the temperature of the second calcining reaction is decreased to a room temperature, to obtain the lithium nickel manganese oxide composite material; preferably, the second calcining process further includes: the temperature of the second calcining reaction is decreased to the room temperature, to obtain a second calcined product; and ultracentrifugal grinding and sieving are performed on the product of the second calcining process, herein an sieving aperture of the sieving process is 300-400 meshes, to obtain the lithium nickel manganese oxide composite material in the form of a single crystal.

Further, a ratio of a mole number of a Li element in the lithium source material to a sum of mole numbers of a Ni element and a Mn element in the oxide-coated nickel-manganese precursor is (1.00~1.05):1.

Another aspect of the disclosure further provides a lithium nickel manganese oxide composite material, and the lithium nickel manganese oxide composite material is prepared by the above preparation method.

Further, in the lithium nickel manganese oxide composite material, a coating amount of the nano-oxide is 0.1-0.3%.

Another aspect of the disclosure further provides a lithium ion battery, including a positive electrode material, and the positive electrode material includes the above lithium nickel manganese oxide composite material.

By applying the technical scheme of the disclosure, the nano-oxide and the nickel-manganese precursor are calcined at a lower temperature, the nano-oxide may be melted, and a denser nano-oxide coating layer is formed on the surface of the nickel-manganese precursor, so the oxide-coated nickel-manganese precursor is obtained; and at a higher temperature, the oxide-coated nickel-manganese precursor and the lithium source material are calcined for the second time, the nano-oxide, a nickel-manganese material and a lithium element may be more deeply combined, thereby a problem that the nano-oxide layer is easy to fall off is solved, and cycle performance of the lithium nickel manganese oxide composite material is greatly improved.

BRIEF DESCRIPTION OF THE DRAWINGS

Drawings of the description for constituting a part of the disclosure are used to provide further understanding of the disclosure, exemplary embodiments of the disclosure and descriptions thereof are used to explain the disclosure, and do not constitute improper limitation to the disclosure. In the drawings.

DETAILED DESCRIPTION OF THE EMBODIMENTS

Figure 1:
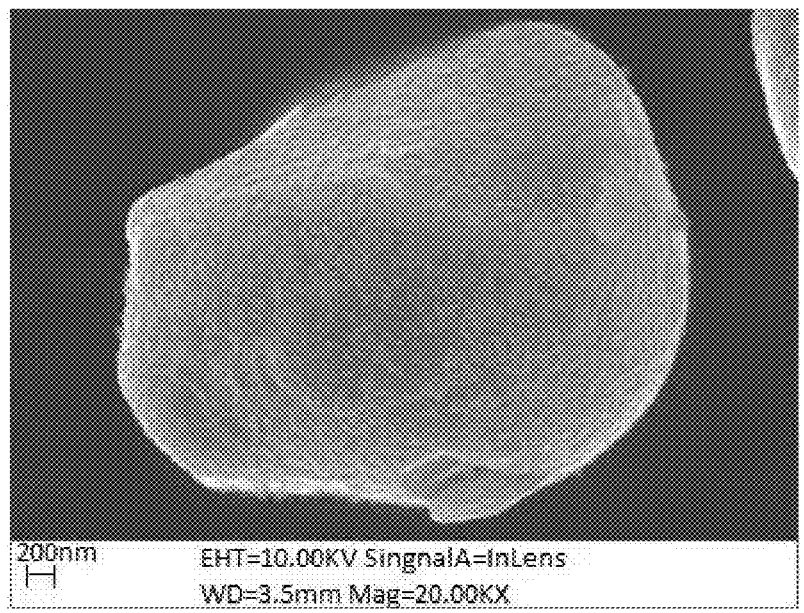
FIG. 1 shows a scanning electron microscope diagram of a lithium nickel manganese oxide composite material prepared according to Embodiment 1 of the disclosure.

It should be noted that embodiments in the disclosure and features in the embodiments may be combined with each other in the case without conflicting. The disclosure is described in detail below in combination with the embodiments.

As described in the background, an existing ternary positive electrode material has a problem that a coating layer is easy to fall off, so that cycle performance of a lithium ion battery is poor. In order to solve the above technical problem, the disclosure provides a preparation method for a lithium nickel manganese oxide composite material, and the preparation method includes: a first calcining process is performed on a nano-oxide and a nickel-manganese precursor, to obtain an oxide-coated nickel-manganese precursor; and a second calcining process is performed on the oxide-coated nickel-manganese precursor and a lithium source material, to obtain the lithium nickel manganese oxide composite material, and a temperature of the first calcining process is lower than a temperature of the second calcining process.

The nano-oxide and the nickel-manganese precursor are calcined at a lower temperature, the nano-oxide may be melted, and a denser nano-oxide coating layer is formed on the surface of the nickel-manganese precursor, so the oxide-coated nickel-manganese precursor is obtained. And at a higher temperature, the oxide-coated nickel-manganese precursor and the lithium source material are calcined for the second time, the nano-oxide, a nickel-manganese material and a lithium element may be more deeply combined, thereby the problem that the nano-oxide layer is easy to fall off is solved, and the cycle performance of the lithium nickel manganese oxide composite material is greatly improved.

The above first calcining process and second calcining process are both an aerobic calcining process, and it may be achieved by devices and processes commonly used in the field. In a preferred embodiment, before the first calcining process is performed, the preparation method further includes: a first mixing step is performed on the nano-oxide and the nickel-manganese precursor, to obtain a first mixture. Before the first calcining is performed, the lithium source material and the nickel-manganese precursor are firstly mixed, it is beneficial to improve mixing uniformity and combination degree of the two materials, and beneficial to improve the uniformity of the oxide coating layer on the oxide-coated nickel-manganese precursor. In order to further improve the mixing uniformity and combination degree of the two materials, preferably, the first mixing step process is mixed for 10-20 min at a rotation speed of 2000-3000 rpm.

The compactness of the oxide coating layer may be improved by the nano-oxide for coating, thereby it is beneficial to improve comprehensive performance of a battery formed. In a preferred embodiment, the nano-oxide includes, but is not limited to, two or more in a group consisting of an aluminum oxide, a zirconium oxide, a titanium oxide, a niobium oxide, a tungsten oxide, a lanthanum oxide, and a molybdenum oxide. Preferably, a particle size of the nano-oxide is 300-700 nm. The particle size of the nano-oxide includes but is not limited to the above range, and while the particle size of the nano-oxide is larger, the compactness of the oxide coating layer may become poor, it is caused that electrochemical performance of the prepared positive electrode material is poorer; and while the particle size is smaller, a cost of the nano-oxide is higher.

The above lithium source material may be selected from commonly used types in the field, such as a lithium hydroxide and/or a lithium carbonate.

In a preferred embodiment, the first calcining process is a temperature programmed process; preferably, the first calcining process includes: in an oxygen atmosphere, a temperature of a first calcining reaction is increased to a first target temperature at a rate of 3-5° C./min, and a holding time is 4-6 h, herein the first target temperature is 300-600° C.; and the temperature of the first calcining reaction is decreased to a room temperature, to obtain the oxide-coated nickel-manganese precursor. The temperature and step time of the first calcining process include but are not limited to the above range, and it is beneficial to further improve the compactness and combination stability of the oxide coating layer on the oxide-coated nickel-manganese precursor through limiting the temperature and step time to the above range.

The lithium nickel manganese oxide composite material prepared by the above preparation method has advantages of stable structure and good cycle performance and the like. In a preferred embodiment, the nickel-manganese precursor is represented by $Ni_xMn_y(OH)_2$, wherein $0.50 \leq x \leq 1.92$, $0.50 \leq y \leq 1.08$, and while the nano-oxide is a mixture of zirconium oxide and aluminum oxide, a weight ratio of the zirconium oxide, the aluminum oxide and the nickel-manganese precursor is (0.001-0.003):(0.001-0.003):1. It is beneficial to further improve the structural stability and binding force of the oxide coating layer through limiting the weight ratio of the zirconium oxide, the aluminum oxide and the nickel-manganese precursor within the above range. Thereby it is beneficial to further improve the cycle performance of the oxide-coated lithium nickel manganese oxide material formed subsequently.

Through the second calcining process, the combination degree between the oxide layer and the lithium nickel manganese oxide may be improved, thereby it is beneficial to improve the cycle performance of the positive electrode material. In a preferred embodiment, before the second calcining process is performed, the above preparation method further includes: a second mixing step is performed on the oxide-coated nickel-manganese precursor and the lithium source material, to obtain a second mixture; before the second calcining is performed, the oxide-coated nickel-manganese precursor and the lithium source material are firstly mixed, it is beneficial to improve the mixing uniformity and combination degree of the two materials, and beneficial to improve the stability of the oxide-coated lithium nickel manganese oxide material. In order to further improve the mixing uniformity and combination degree of the two materials, preferably, the second mixing step process is mixed for 10-20 min at a rotation speed of 2000-3000 rpm.

In a preferred embodiment, the preparation method further includes: a product of the first calcining process is sieved, to obtain the oxide-coated nickel-manganese precursor, and a sieving aperture of the sieving process is 300-400 meshes (38-48 μm). Before the second calcining process is performed, the sieving process is firstly performed on the product of the first calcining process, and it is beneficial to improve the stability of the electrochemical performance of the subsequent lithium nickel manganese oxide composite material.

In a preferred embodiment, the second calcining process is a temperature programmed process; preferably, the second calcining process includes: in an oxygen atmosphere, a temperature of a second calcining reaction is increased to a second target temperature at a rate of 3-5° C./min, and a holding time is 8-12 h, herein the second target temperature is 910-950° C.; and the temperature of the second calcining reaction is decreased to the room temperature, to obtain the lithium nickel manganese oxide composite material. The temperature and step time of the second calcining process include but are not limited to the above range, and it is beneficial to further improve the cycle performance and electric capacity of the oxide-coated lithium nickel manganese oxide material through limiting the temperature and treatment time within the above range.

The oxygen atmosphere referred in the disclosure means that an oxygen concentration is greater than 99.99%, and more preferably, a flow rate of the oxygen is 5-10 L/min.

In a preferred embodiment, a ratio of a mole number of a Li element in the lithium source material to a sum of mole numbers of a Ni element and a Mn element in the oxide-coated nickel-manganese precursor is (1.00~1.05):1. It is beneficial to further improve the energy density, electric capacity and structural stability of the positive electrode material through limiting the ratio of the mole number of the Li element in the lithium source material to the sum of the mole numbers of the Ni element and the Mn element in the nickel-manganese precursor within the above range.

In a preferred embodiment, the above preparation method further includes: the temperature of the second calcining reaction is decreased to the room temperature, to obtain a second calcined product; and ultracentrifugal grinding and sieving are performed on the product of the second calcining process, herein an sieving aperture of the sieving process is 300-400 meshes (38-48 μm), to obtain the lithium nickel manganese oxide composite material in the form of a single crystal. During initial charge-discharge processes, the surface of the above single crystal material may fully contact and react with electrolyte, and a stable positive solid electrolyte interface film is formed in an initial cycle. However, contraction and expansion of the later cyclic charge-discharge may not produce a new crystal boundary interface like polycrystalline particles, and a side reaction may not occur. Therefore, the above lithium nickel manganese oxide single crystal material may greatly reduce gas production, and improve the cycle performance during an application process.

Another aspect of the disclosure provides a lithium nickel manganese oxide composite material, and the lithium nickel manganese oxide composite material is prepared by the above preparation method.

The nano-oxide and the nickel-manganese precursor are calcined at a lower temperature, the nano-oxide may be melted, and a denser nano-oxide coating layer is formed on the surface of the nickel-manganese precursor, so the oxide-coated nickel-manganese precursor is obtained; and at a higher temperature, the oxide-coated nickel-manganese precursor and the lithium source material are calcined for the second time, the nano-oxide, a nickel-manganese material and a lithium element may be combined in a greater degree, thereby a problem that the nano-oxide layer is easy to fall off is solved, and the cycle performance of the battery using the above lithium nickel manganese oxide composite material as the positive electrode material may be greatly improved.

In a preferred embodiment, in the lithium nickel manganese oxide composite material, a coating amount of the nano-oxide is 0.1-0.3%. The nano-oxide plays a better synergistic effect with the lithium element, the nickel element and the manganese element through limiting the coating amount of the nano-oxide within the above range, so that the lithium nickel manganese oxide composite material may have more excellent electrical properties, such as long cycle performance and high capacity.

Another aspect of the disclosure further provides a lithium ion battery, including a positive electrode material, and the positive electrode material includes the above lithium nickel manganese oxide composite material provided in the disclosure.

The oxide layer in the lithium nickel manganese oxide composite material prepared by the above method is not easy to fall off, and the cycle performance of the battery may be greatly improved by the lithium nickel manganese oxide composite material as the positive electrode material for preparing the lithium ion battery.

The disclosure is further described in detail below in combination with specific embodiments, and these embodiments should not be interpreted as limiting the scope of protection claimed by the disclosure.

Embodiment 1

A synthesis method for a long-cycle lithium nickel manganese oxide NM single crystal positive electrode material, the synthesis method includes:

(1) Zirconium oxide and aluminum oxide co-coated nickel manganese hydroxide $Ni_xMn_y(OH)_2$ precursor mixing stage:

A zirconium oxide, an aluminum oxide and a precursor $Ni_{0.75}Mn_{0.25}(OH)_2$ are weighed in a weight ratio of 0.002:0.002:1, uniformly mixed in a high-speed mixing device, herein a stirring speed is 2500 rpm, and mixing time is 15 min, and a nickel manganese hydroxide $Ni_xMn_y(OH)_2$ precursor co-coated with the zirconium oxide and the aluminum oxide is obtained.

(2) Zirconium oxide and aluminum oxide co-coated nickel manganese hydroxide $Ni_xMn_y(OH)_2$ precursor calcining stage:

The above base material is placed in a box-type atmosphere furnace, in an oxygen atmosphere (a concentration is greater than 99.99%, oxygen flow rate: 5-10 L/min). A temperature is increased to 500° C. at 4° C./min, and holding time is 5 h, then the base material is obtained by being naturally decreased to a room temperature. The obtained base material is sieved with a sieve of 400 meshes, and the obtained material is marked as NMZA.

(3) Lithium nickel manganese oxide single crystal positive electrode material synthesis stage:

Mixing stage: lithium hydroxide and base material NMZA are mixed at Li/Me=1.03 (Me refers to a sum of mole numbers of a Ni element and a Mn element in the base material) in the high-speed mixing device, herein a stirring speed is 2000 rpm, and mixing time is 10 min, a homogeneous mixture of the base material NMZA and the lithium hydroxide is obtained.

Calcining stage: the box-type atmosphere furnace is used. The homogeneous mixture of the base material NMZA and the lithium hydroxide is placed in the box-type atmosphere furnace and calcined in an oxygen atmosphere (a concentration is greater than 99.99%, oxygen flow rate: 5-10 L/min), a temperature is increased to 950° C. at a heating rate of 4° C./min, holding time is 10 h. And then the temperature is naturally decreased to the room temperature, an obtained material is subjected to ultracentrifugal grinding and sieving, a sieve is 400 meshes, and finally the lithium nickel manganese oxide single crystal positive electrode material NM is obtained. Herein in the lithium nickel manganese oxide single crystal positive electrode material NM, a coating amount of the aluminum oxide is 0.2%, and a coating amount of the zirconium oxide is 0.2%.

Finally, the obtained lithium nickel manganese oxide single crystal positive electrode material NM is mixed with a conductive agent and a binder, and after mixing uniformly, coating, rolling, and cutting are performed, and a button battery is assembled. The electrochemical performance of the positive electrode material is tested.

A Zeiss scanning electron microscope is used to detect the lithium nickel manganese oxide composite material, as shown in FIG. 1. And it may be seen from FIG. 1 that the surface coating layer of lithium nickel manganese oxide single crystal particles synthesized by the coating method used in the disclosure is more uniform, the coating layer is more uniform in thickness, and a particle size is about 3.5 µm.

A charge-discharge test method is used to test the electrochemical performance of the lithium nickel manganese oxide composite material. Test data is shown in Table 1, and an electrochemical performance curve is shown in FIG. 2.

TABLE 1

| 0.1 C charge capacity (mAh/g) | 0.1 C discharge capacity (mAh/g) | First efficiency (%) | 50-cycle retention rate (%) |
|---|---|---|---|
| 217.9 | 187.5 | 86.0 | 98.6 |

Figure 2:
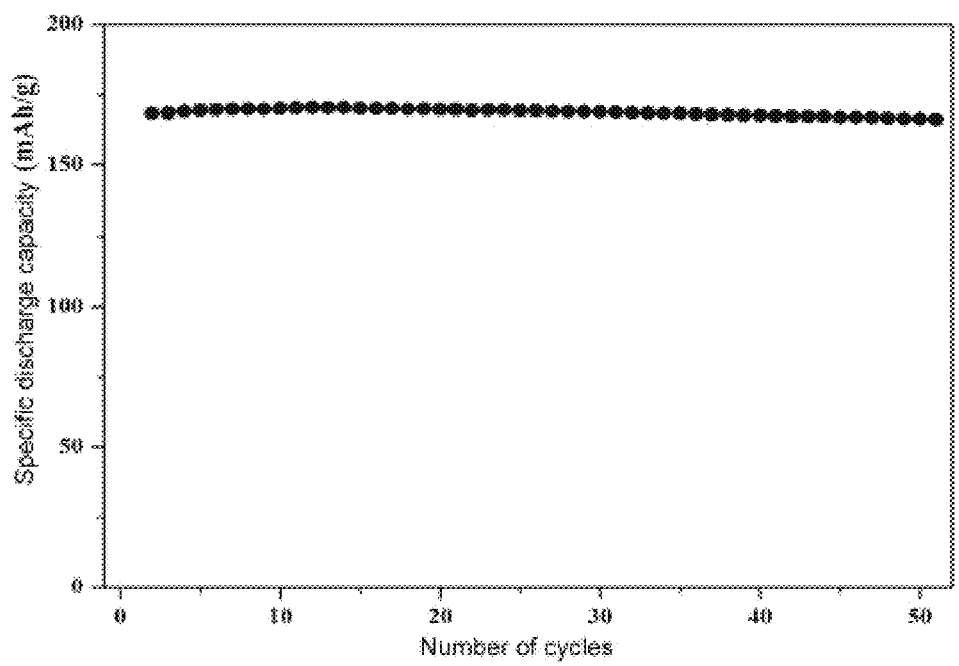
FIG. 2 shows electrochemical performance of the lithium nickel manganese oxide composite material prepared according to Embodiment 1 of the disclosure.
Figure 3:
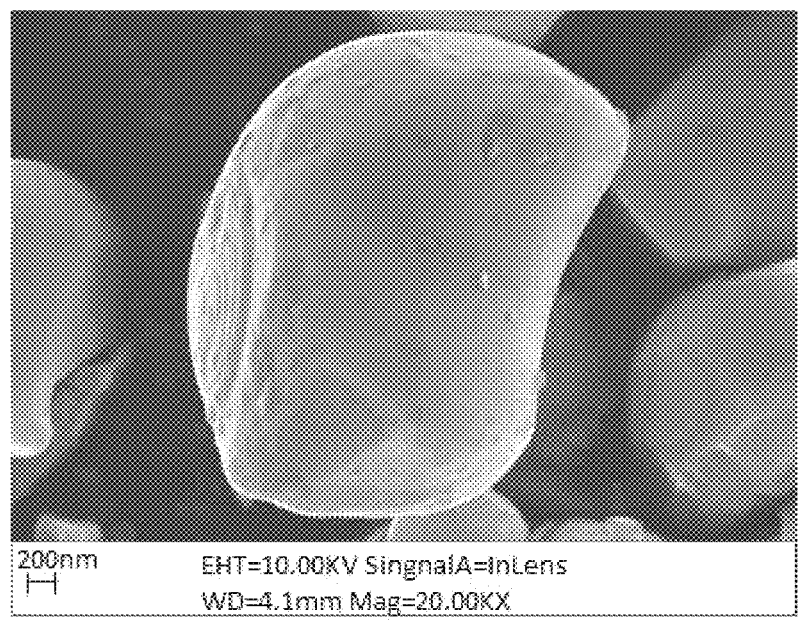
FIG. 3 shows a scanning electron microscope diagram of a lithium nickel manganese oxide composite material prepared according to an existing method.

It may be seen from Table 1 and FIG. 2 that the first discharge capacity of the material is 187.5 mAh/g, the first discharge coulombic efficiency is 86.0%, and the 50-cycle retention rate is 98.6%. It may be seen from the cycle curve that the lithium nickel manganese oxide composite material is used as the positive electrode material, and its cycle performance is good, and there is basically no attenuation after 50 cycles.

Embodiment 2

A difference from Embodiment 1 is that a temperature of a first calcining process is 300° C., and a temperature of a second calcining process is 950° C.

A cycle capacity retention rate of the lithium nickel manganese oxide composite material at 50 cycles is 96.4%, and a discharge capacity is 185.2 Ah/g.

Embodiment 3

A difference from Embodiment 1 is that a temperature of a first calcining process is 600° C., and a temperature of a second calcining process is 910° C.

A cycle capacity retention rate of the lithium nickel manganese oxide composite material at 50 cycles is 95.1%, and a discharge capacity is 183.8 Ah/g.

Embodiment 4

A difference from Embodiment 1 is that a temperature of a first calcining process is 700° C.

A cycle capacity retention rate of the lithium nickel manganese oxide composite material at 50 cycles is 93.4%, and a discharge capacity is 181.6 Ah/g.

Embodiment 5

A difference from Embodiment 1 is that a temperature of a second calcining process is 970° C.

A cycle capacity retention rate of the lithium nickel manganese oxide composite material at 50 cycles is 92.6%, and a discharge capacity is 180.5 Ah/g.

Embodiment 6

A difference from Embodiment 1 is that a ratio of a mole number of a Li element in the lithium source material to a sum of mole numbers of a Ni element and a Mn element in the nickel-manganese precursor is 1:1.

A cycle capacity retention rate of the lithium nickel manganese oxide composite material at 50 cycles is 95.7%, and a discharge capacity is 184.7 Ah/g.

Embodiment 7

A difference from Embodiment 1 is that a ratio of a mole number of a Li element in the lithium source material to a sum of mole numbers of a Ni element and a Mn element in the nickel-manganese precursor is 1.05:1.

A cycle capacity retention rate of the lithium nickel manganese oxide composite material at 50 cycles is 97.2%, and a discharge capacity is 186.3 Ah/g.

Embodiment 8

A difference from Embodiment 1 is that a ratio of a mole number of a Li element in the lithium source material to a sum of mole numbers of a Ni element and a Mn element in the nickel-manganese precursor is 1.5:1.

A cycle capacity retention rate of the lithium nickel manganese oxide composite material at 50 cycles is 92.1%, and a discharge capacity is 181.2 Ah/g.

Embodiment 9

A difference from Embodiment 1 is that, after a second calcining step, ultracentrifugal grinding and sieving processes are not performed.

A cycle capacity retention rate of the lithium nickel manganese oxide composite material at 50 cycles is 94.5%, and a discharge capacity is 184.1 Ah/g.

Embodiment 10

A difference from Embodiment 1 is that a coating amount of an aluminum oxide is 0.5%, and a coating amount of a zirconium oxide is 0.5%.

A cycle capacity retention rate of the lithium nickel manganese oxide composite material at 50 cycles is 92.7%, and a discharge capacity is 182.0 Ah/g.

Embodiment 11

A difference from Embodiment 1 is that an oxide coating agent is titanium oxide and niobium oxide.

A cycle capacity retention rate of the lithium nickel manganese oxide composite material at 50 cycles is 95.8%, and a discharge capacity is 186.4 Ah/g.

Embodiment 12

A difference from Embodiment 1 is that an oxide coating agent is niobium oxide and tungsten oxide.

A cycle capacity retention rate of the lithium nickel manganese oxide composite material at 50 cycles is 95.2%, and a discharge capacity is 185.9 Ah/g.

Embodiment 13

A difference from Embodiment 1 is that an oxide coating agent is aluminum oxide and lanthanum oxide.

A cycle capacity retention rate of the lithium nickel manganese oxide composite material at 50 cycles is 94.7%, and a discharge capacity is 184.8 Ah/g.

Contrast Example 1

A traditional method mainly includes two parts of the content: base synthesis and base coating. A main process flow is as follows.
(1) Base Synthesis
Raw material mixing: LiOH and precursor $Ni_{0.75}Mn_{0.25}(OH)_2$ are mixed with a high-speed mixing device, mixing time: 20 min, and rotation speed: 2000 rpm.
High temperature reaction: a mixed material is reacted in an oxygen atmosphere (a concentration is greater than 99.99%, oxygen flow rate: 5-10 L/min) in a box-type atmosphere furnace at a high temperature of 930° C. for 10 h, and a base material is obtained after being naturally cooled. The base material is crushed with a crushing device, an obtained powder material is sieved with a sieve of 400 meshes.
(2) Base Coating
Dry coating: this step is to uniformly coat the base material with the coating agents zirconium oxide and aluminum oxide, a specific step of this process is that the zirconium oxide, the aluminum oxide and the base material are added to a mixing device for mixing together in a mass ratio of 0.002:0.002:1, mixing time: 20 min, and rotation speed: 2000 rpm.
Annealing step: the coated material is treated at a high temperature of 500° C. for 5 h, and the high temperature step is performed in an oxygen atmosphere (a concentration range is 20-100%), and it is sieved with 400 meshes, to obtain a final product of the lithium nickel manganese oxide single crystal positive electrode material NM.

The synthesized lithium nickel manganese oxide single crystal positive electrode material has a 50-cycle capacity retention rate of 92.5% and a discharge capacity of 180.7 Ah/g.

It may be seen from the above descriptions that the above embodiments of the disclosure achieve the following technical effects.

It may be seen by comparing Embodiments 1 to 13 and Contrast Example 1 that the lithium nickel manganese oxide composite material prepared by the method provided in the disclosure has more excellent cycle performance and electric capacity, and at the same time, the positive electrode material also has a relatively low cost because a cobalt element is not contained.

It may be seen by comparing Embodiments 1 to 5 that it is beneficial to further improve the cycle performance and electric capacity of the lithium nickel manganese oxide composite material through limiting the temperatures of the first sintering step and second sintering step processes within the preferred range of the disclosure.

It may be seen by comparing Embodiments 1, 6 to 8 that it is beneficial to further improve the cycle performance and electric capacity of the lithium nickel manganese oxide composite material through limiting the ratio of the mole number of the Li element in the lithium source material to the sum of the mole numbers of the Ni element and Mn element in the nickel-manganese precursor within the preferred range of the disclosure.

It may be seen by comparing Embodiments 1, 10 to 13 that it is beneficial to improve the cycle performance and electric capacity of the lithium nickel manganese oxide composite material through the preferred coating agent of the disclosure and limiting the coating amount within the preferred range of the disclosure.

It should be noted that terms "first" and "second" and the like in the description and claims of the disclosure are used to distinguish similar objects, and not necessarily used to describe a specific sequence or precedence order. It should be understood that the terms used in this way may be interchanged under appropriate circumstances, so that the implementation modes of the disclosure described herein may be implemented, for example, in a sequence other than those described here.

The above are only preferred embodiments of the disclosure, and are not used to limit the disclosure. Various modifications and changes may be made to the disclosure by those skilled in the art. Any modifications, equivalent replacements, improvements and the like made within the spirit and principle of the disclosure should be included in a scope of protection of the disclosure.

What is claimed is:

1. A preparation method for a lithium nickel manganese oxide composite material, the preparation method comprises:
performing a first calcining process on a nano-oxide and a nickel-manganese precursor, to obtain an oxide-coated nickel-manganese precursor; wherein the nickel-manganese precursor is represented by $Ni_xMn_y(OH)_2$, $0.50 \leq x \leq 0.92$, $0.50 \leq y \leq 0.8$; the nano-oxide is selected from two or more in a group consisting of an aluminum oxide, a zirconium oxide, a titanium oxide, a niobium oxide, a tungsten oxide, a lanthanum oxide and a molybdenum oxide; and
performing a second calcining process on the oxide-coated nickel-manganese precursor and a lithium source material, to obtain the lithium nickel manganese oxide composite material, and a temperature of the first calcining process is lower than a temperature of the second calcining process.

2. The preparation method according to claim 1, wherein before performing the first calcining process, the preparation method further comprises:
performing a first mixing step on the nano-oxide and the nickel-manganese precursor, to obtain a first mixture;
wherein the first mixing step process is mixed for 10-20 min at a rotation speed of 2000-3000 rpm.

3. The preparation method according to claim 2, wherein the first calcining process is a temperature programmed process;
the first calcining process comprises:
in an oxygen atmosphere, increasing a temperature of a first calcining reaction to a first target temperature at a rate of 3-5° C./min, and a holding time is 4-6 h, wherein the first target temperature is 300-600° C.; and
decreasing the temperature of the first calcining reaction to a room temperature, to obtain the oxide-coated nickel-manganese precursor.

4. The preparation method according to claim 3, wherein the nano-oxide is a mixture of zirconium oxide and aluminum oxide, a weight ratio of the zirconium oxide, the aluminum oxide and the nickel-manganese precursor is (0.001-0.003):(0.001-0.003):1.

5. The preparation method according to claim 4, wherein before performing the second calcining process, the preparation method further comprises:
performing a second mixing step on the oxide-coated nickel-manganese precursor and the lithium source material, to obtain a second mixture;
wherein the second mixing step process is mixed for 10-20 min at a rotation speed of 2000-3000 rpm.

6. The preparation method according to claim 5, wherein the second calcining process is a temperature programmed process;
the second calcining process comprises:
in an oxygen atmosphere, increasing a temperature of a second calcining reaction to a second target temperature at a rate of 3-5° C./min, and holding time is 8-12 h, wherein the second target temperature is 910-950° C.; and
decreasing the temperature of the second calcining reaction to a room temperature, to obtain the lithium nickel manganese oxide composite material.

7. The preparation method according to claim 3, wherein before performing the second calcining process, the preparation method further comprises:
performing a second mixing step on the oxide-coated nickel-manganese precursor and the lithium source material, to obtain a second mixture;
wherein the second mixing step process is mixed for 10-20 min at a rotation speed of 2000-3000 rpm.

8. The preparation method according to claim 2, wherein the nano-oxide is a mixture of zirconium oxide and aluminum oxide, a weight ratio of the zirconium oxide, the aluminum oxide and the nickel-manganese precursor is (0.001-0.003):(0.001-0.003):1.

9. The preparation method according to claim 2, wherein before performing the second calcining process, the preparation method further comprises:
performing a second mixing step on the oxide-coated nickel-manganese precursor and the lithium source material, to obtain a second mixture;
wherein the second mixing step process is mixed for 10-20 min at a rotation speed of 2000-3000 rpm.

10. The preparation method according to claim 1, wherein before performing the second calcining process, the preparation method further comprises:
performing a second mixing step on the oxide-coated nickel-manganese precursor and the lithium source material, to obtain a second mixture;
wherein the second mixing step process is mixed for 10-20 min at a rotation speed of 2000-3000 rpm.

11. The preparation method according to claim 10, wherein the second calcining process is a temperature programmed process;
the second calcining process comprises:
in an oxygen atmosphere, increasing a temperature of a second calcining reaction to a second target temperature at a rate of 3-5° C./min, and holding time is 8-12 h, wherein the second target temperature is 910-950° C.; and
decreasing the temperature of the second calcining reaction to a room temperature, to obtain the lithium nickel manganese oxide composite material.

12. The preparation method according to claim 10, wherein a ratio of a mole number of a Li element in the lithium source material to a sum of mole numbers of a Ni element and a Mn element in the oxide-coated nickel-manganese precursor is (1.00~1.05):1.

13. The preparation method according to claim 10, wherein the second calcining process further comprises: decreasing the temperature of the second calcining reaction to the room temperature, to obtain a second calcined product; and performing ultracentrifugal grinding and sieving on the product of the second calcining process, wherein a sieving aperture of the sieving process is 300-400 meshes, to obtain the lithium nickel manganese oxide composite material in the form of a single crystal.

14. A lithium nickel manganese oxide composite material, wherein the lithium nickel manganese oxide composite material is prepared by the preparation method according to claim 1.

15. The lithium nickel manganese oxide composite material according to claim 14, wherein in the lithium nickel manganese oxide composite material, a coating amount of the nano-oxide is 0.1-0.3%.

16. A lithium ion battery, comprising a positive electrode material, wherein the positive electrode material comprises the lithium nickel manganese oxide composite material according to claim 14.

17. The lithium nickel manganese oxide composite material according to claim 14, wherein before performing the first calcining process, the preparation method further comprises:
  performing a first mixing step on the nano-oxide and the nickel-manganese precursor, to obtain a first mixture;
  wherein the first mixing step process is mixed for 10-20 min at a rotation speed of 2000-3000 rpm.

18. The lithium nickel manganese oxide composite material according to claim 17, wherein the nano-oxide is a mixture of zirconium oxide and aluminum oxide, a weight ratio of the zirconium oxide, the aluminum oxide and the nickel-manganese precursor is (0.001-0.003):(0.001-0.003):1.

19. The preparation method according to claim 1, wherein a particle size of the nano-oxide is 300-700 nm.

20. The preparation method according to claim 1, the preparation method further comprises: sieving a product of the first calcining process, to obtain the oxide-coated nickel-manganese precursor, and a sieving aperture of the sieving process is 300-400 meshes.

\* \* \* \* \*